United States Patent [19]
Correia, II

[11] Patent Number: 5,926,534
[45] Date of Patent: Jul. 20, 1999

[54] PREEMPTIVE TELECOMMUNICATION INTERFACE FOR COMPUTER SYSTEMS

[76] Inventor: Bernard A. Correia, II, P.O. Box 42242, Houston, Tex. 77242

[21] Appl. No.: 09/112,846

[22] Filed: Jul. 10, 1998

Related U.S. Application Data

[63] Continuation of application No. 08/696,400, Aug. 14, 1996, abandoned.

[51] Int. Cl.⁶ .......................... H04M 11/00; H04M 1/66
[52] U.S. Cl. ................. 379/199; 379/93.02; 379/93.03; 379/102.04; 379/211
[58] Field of Search ................................. 379/188, 189, 379/190, 191, 192, 193, 196, 197, 198, 199, 142, 372, 373, 211, 219, 220, 413, 102.04, 93.01, 93.02, 93.03

[56] References Cited

U.S. PATENT DOCUMENTS

| | | | |
|---|---|---|---|
| 4,415,774 | 11/1983 | Driver | 379/102.04 |
| 4,633,039 | 12/1986 | Holden | 379/269 |
| 4,647,721 | 3/1987 | Busam et al. | 379/102.04 |
| 4,656,318 | 4/1987 | Noyes | 379/102.04 |
| 4,723,269 | 2/1988 | Summerlin | 379/102.04 |
| 4,878,196 | 10/1989 | Rose | 379/102.04 |
| 4,893,329 | 1/1990 | O'Brien | 379/199 |
| 4,924,496 | 5/1990 | Figa et al. | 379/199 |
| 5,127,045 | 6/1992 | Cragun et al. | 379/67.1 |
| 5,191,323 | 3/1993 | Abbes et al. | 379/102.04 |
| 5,198,806 | 3/1993 | Lord | 379/102.04 |
| 5,228,080 | 7/1993 | Nutter et al. | 379/373 |
| 5,229,942 | 7/1993 | Nicholson et al. | 379/102.04 |
| 5,255,183 | 10/1993 | Katz | 379/199 |
| 5,276,731 | 1/1994 | Arbel et al. | 379/199 |
| 5,349,638 | 9/1994 | Pitroda et al. | 379/142 |
| 5,351,289 | 9/1994 | Logsdon et al. | 379/142 |
| 5,410,713 | 4/1995 | White et al. | 379/102.04 |
| 5,537,462 | 7/1996 | Utter et al. | 379/102.04 |
| 5,553,125 | 9/1996 | Martensson | 379/199 |

*Primary Examiner*—Scott Wolinsky
*Attorney, Agent, or Firm*—John R Casperson

[57] ABSTRACT

A preemptive telecommunication interface is provided with a microprocessor, non-volatile storage media containing a database, and software. The microprocessor is capable of reading incoming signals designating telephone numbers from the telephone company. The microprocessor is further capable of comparing an incoming telephone number to an authorized list of telephone numbers kept in the database. If an incoming telephone number is among those authorized, the telephone call is "answered" and a telecommunication line is connected to a main computer system or facsimile machine. If the incoming telephone number is not among those authorized, the telephone call is "preempted" (i.e., not answered).

8 Claims, 3 Drawing Sheets

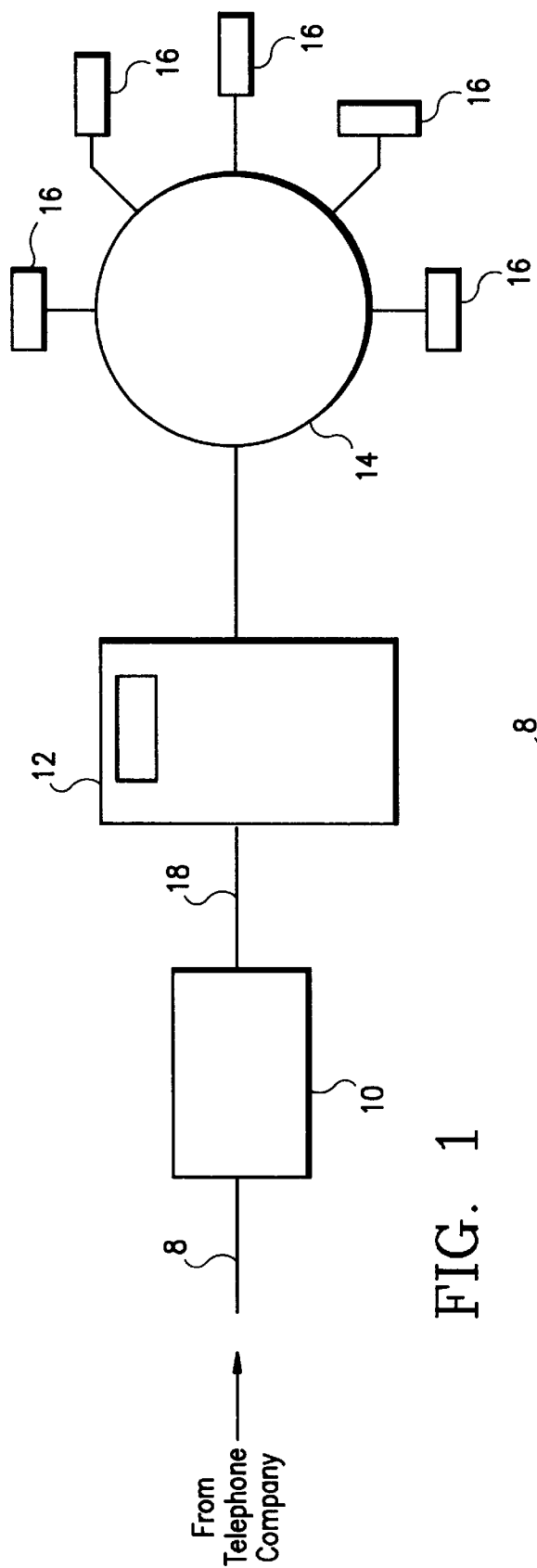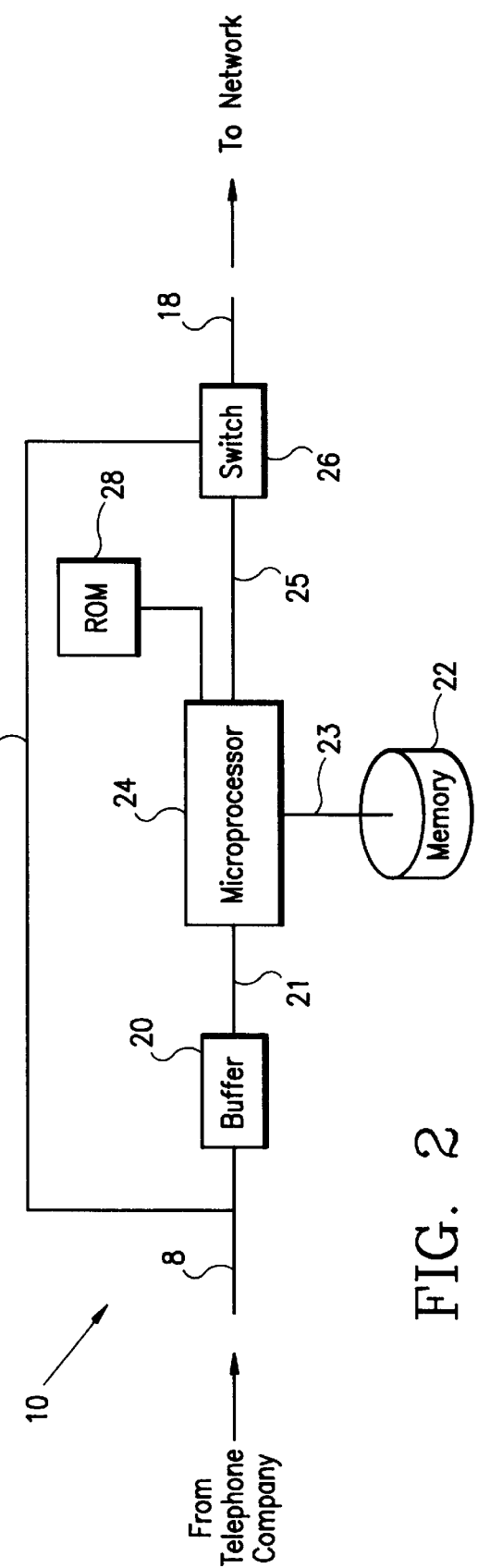

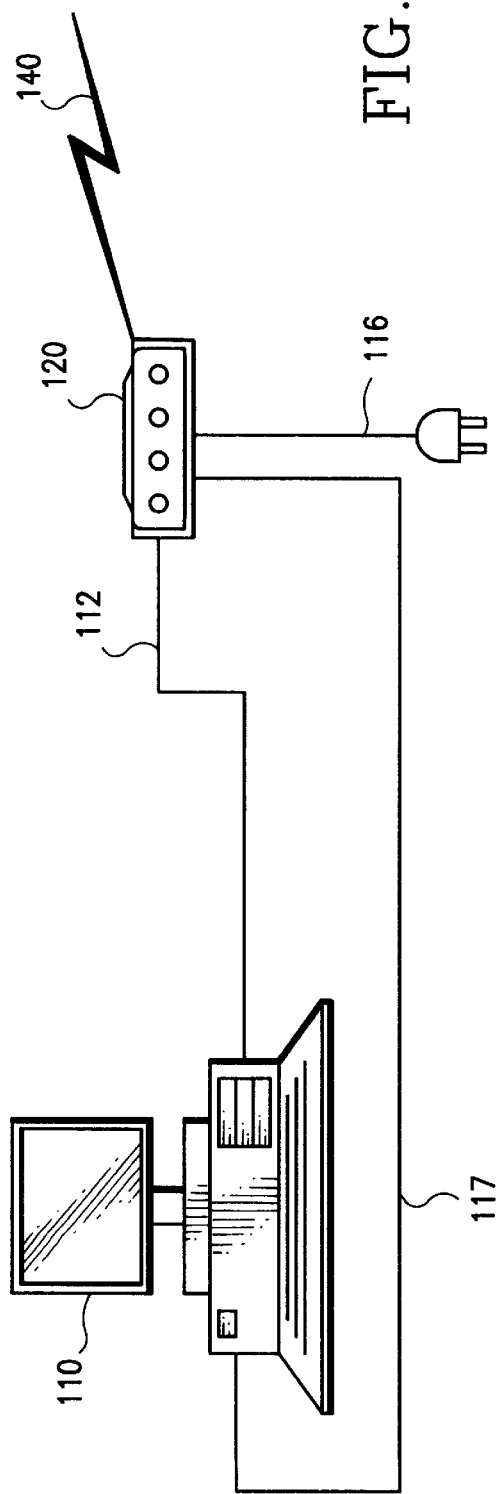
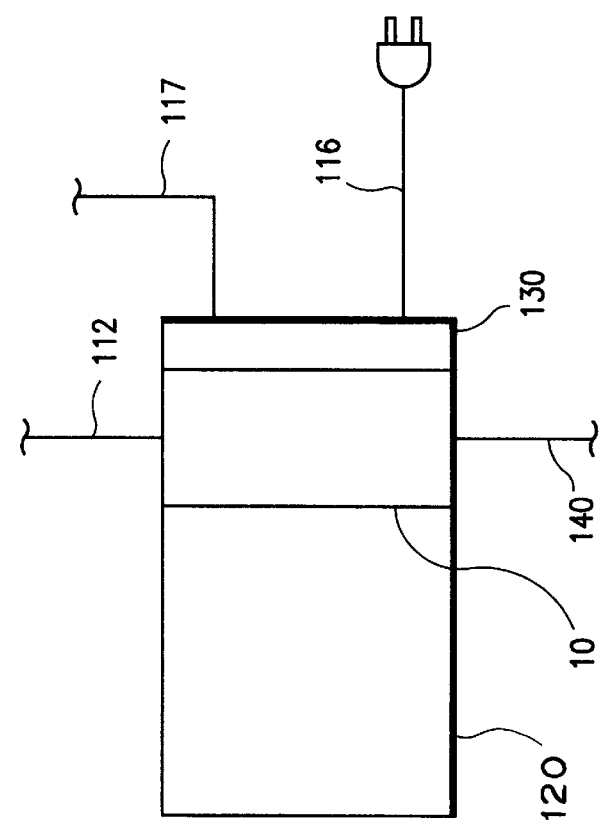

PREEMPTIVE TELECOMMUNICATION INTERFACE FOR COMPUTER SYSTEMS

CROSS REFERENCES TO RELATED APPLICATIONS

This application is a continuation of application Ser. No. 08/696,400, filed Aug. 14, 1996, now abandoned.

BACKGROUND OF THE INVENTION

The present invention relates to telecommunications systems. More particularly, the present invention relates to an apparatus that allows direct telecommunications between two computer systems only under restricted and predefined circumstances.

Telephone companies have begun to offer to their customers a system called "CALLER ID." This system enables a customer, after having purchased special receiving equipment from their telephone company, to view the telephone number of the person calling them. The CALLER ID system sends a signal to the special receiving equipment and displays the telephone number of the caller on a liquid crystal display (LCD). With the telephone number of the caller known, the customer can make an informed decision about whether or not to answer the telephone.

In recent years, unauthorized access to computer systems has become a serious problem. Unauthorized users, called hackers, place a telephone call to the computer system to which they wish to access. Upon establishing the telephone link, the hacker is prompted by the computer network to supply his user-name and password. Instead of providing a legitimate user-name and password, the hacker uses his custom software to circumvent the password protection system and gain access to the network operating system. Once "in" the network, the hacker can read and modify files containing sensitive information. The hacker also has the ability to destroy large numbers of computer files and reek havoc within the network—causing many thousands of dollars in damages. As a lasting legacy, a hacker may leave a computer software virus that can cause even more damage to the computer network. More than 5000 viruses currently exist and hundreds are created each month. These viruses cause millions of dollars in damages each year. The complexity and sophistication of the virus software programs is continually met by equally determined efforts, on the part of network administrators, to prevent their use. This has led to a "cat-and-mouse" game between the network administrators and the hackers. As anti-viral network protection becomes more sophisticated, the hackers get smarter and more determined.

The threat of viruses and hackers is so potent that a whole industry has evolved to counter that threat. Anti-virus software is now widely available. Large networks, which utilize telecommunications to allow remote users to link into the network, have adopted software "firewalls." Firewalls are software programs that are designed to prevent unauthorized access to network operating systems and sensitive data. Unfortunately, effective firewalls are so expensive that smaller capitalized networks are forced to do without effective protection. Furthermore, the determination and technical abilities of hackers ensures that some will get through the firewalls or other defenses and damage the network.

Home businesses and telecommuters, who rely on facsimile/modem features of their personal computers (PC) in the course of their business, are susceptible to unwanted facsimile messages and unauthorized access to their PC's operating system and data files. Home users generally lack the sophistication and resources of the network administrator. Proper back-up procedures, which are common in major network systems, are less likely to be implemented in the home-based system. These facts make home-based systems even more vulnerable to the hacker's evil efforts.

There is, therefore, a need in the art for inexpensive and effective prevention of unauthorized access to computer networks and PCs. It is an object of the present invention to remedy problems in the prior art.

SUMMARY OF THE INVENTION

The present invention solves the problems inherent in the prior art. The preferred embodiment of the present invention utilizes a separate microprocessor, a buffer, a switch, non-volatile storage media, and operating software. The present invention can read the CALLER ID signals sent by the telephone company that designate the telephone number of the caller. The microprocessor in the present invention can then read and compare the incoming telephone number to a list of authorized telephone numbers kept in the database on the storage media. If the calling telephone number is among the authorized telephone numbers, the phone is "answered" and the telecommunication connection to the computer network is established. If the calling telephone number is not among the authorized telephone numbers, the phone is not answered and a connection to the computer network or facsimile machine is never established.

If a hacker tries to access the network, he must do so from an unauthorized telephone. When the hacker attempts to gain access to the network, the present invention will note that the call originates from an unauthorized telephone number and will not connect the network to the hacker. If the hacker cannot establish a telecommunication link to the network, the hacker cannot employ his custom tools and reek havoc within the network. Even if the hacker can emulate another telephone number, he must know the correct number beforehand. The chance of a hacker getting the correct telephone number (and placing a call under that number) at random, is negligible.

The present invention is also useful to the home-based telecommuter or small business. In the case of unwanted facsimiles, the present invention can compare the telephone number of the unwanted facsimile solicitor to the authorized list of clients. If the telephone number is not on the authorized list, the telephone is not "answered," preventing access to the facsimile device.

An alternate embodiment of the invention has the receiving/switching equipment in the modem of a personal computer. With the invention, a person can call their PC from home or work, and boot the computer, and begin operation. In this way, the computer can be left off until needed, thereby saving energy.

The present invention is also useful to computer bulletin board system (BBS) operators. With the present invention, the BBS operators can restrict access to the BBS to those telephone numbers that are authorized. Calls from unauthorized telephone numbers are never answered.

BRIEF DESCRIPTION OF THE DRAWINGS

FIG. 1 shows the present invention connected to a typical computer network;

FIG. 2 is a schematic representation of the internal arrangement of the present invention;

FIG. 4 shows an arrangement of an alternate embodiment of the present invention in a modified external modem of a personal computer; and FIG. 5 is a schematic representation of a modified external modem of an alternate embodiment of the present invention.

DETAILED DESCRIPTION OF THE INVENTION

Figure 3:
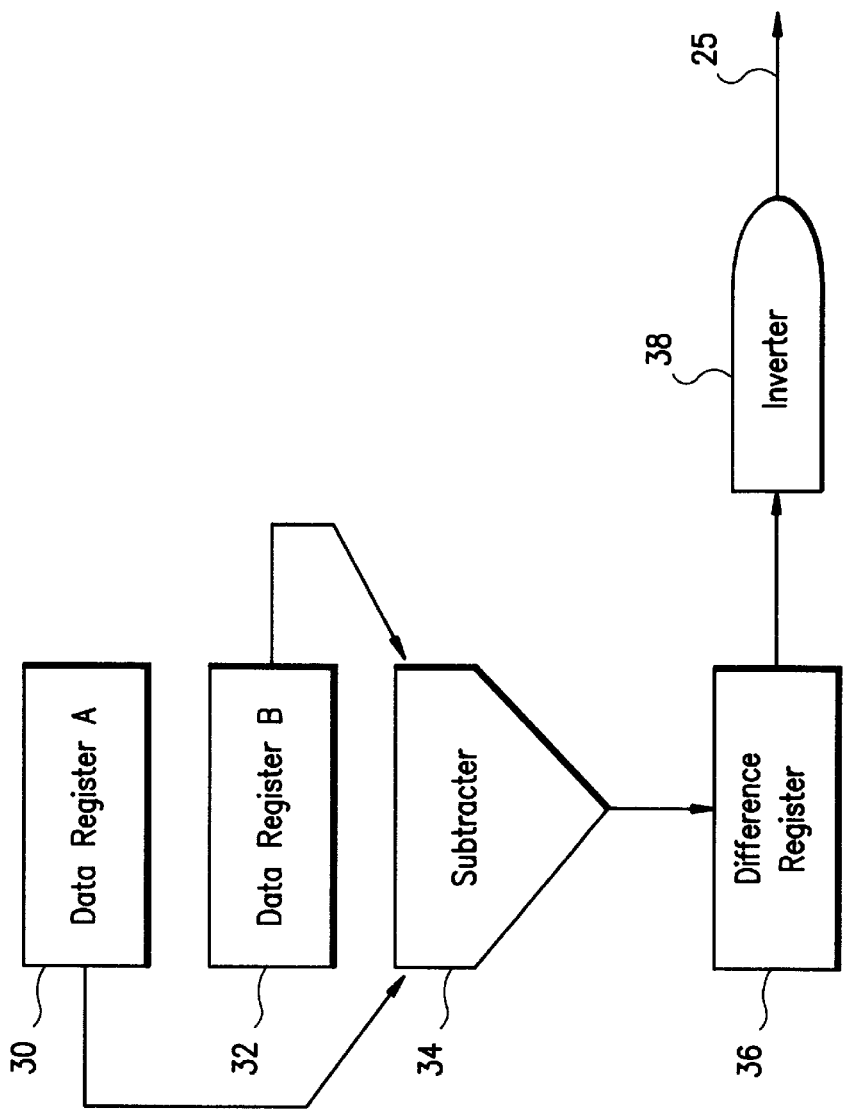
FIG. 3 is a schematic representation of the internal architecture of a microprocessor of the present invention.

As shown in FIG. 1, the telecommunication preempter system 10 of the present invention receives a signal from the telephone company along a standard telephone line 8 which forms a receiving means. As shown in FIG. 1, the preempter system 10 is connected to a network server 12 by telephone line 18. In FIG. 1, the network server is the designated device which can accept incoming telephone calls. The present invention can be used equally well when it is connected to a PC or facsimile machine (not shown) in lieu of the network server 12. As shown in FIG. 1, the network server 12 is connected to various client work stations 16 on a network ring 14.

The operation of the present invention is as follows, with reference to the schematic drawings in FIGS. 2 and 3:

If the user is equipped with CALLER ID, then the incoming telephone number will be among the first signals to arrive on the telephone line 8. The incoming telephone number is stored in a buffer 20. The buffer 20 can be a small dynamic random access memory (DRAM) or another device such as an electronically erasable programmable read only memory (EEPROM) that can store a small amount of information for a short period of time. Such a DRAM or EEPROM, among other devices, can form the buffer means. The amount of DRAM necessary for the buffer 20 is relatively small because telephone numbers typically contain less than twenty numerical digits.

The storage device 22 is used for the storage means. The storage device 22 is preferably non-volatile. A suitable storage device 22 is a common hard disk drive. The storage device 22 contains a list of authorized telephone numbers, usually in a database format. The capacity of the storage device depends upon the number of authorized telephone numbers needed. Even a small disk drive, such as a 20 MB drive, could hold many thousands of authorized telephone numbers and other necessary information.

A microprocessor is the heart of the comparison means for determining if the incoming call is valid. A microprocessor 24 is connected to the buffer 20 and the storage device 22 by cables 21 and 23, respectively. Upon booting of the system 10, operating software from a read-only-memory (ROM) device 28 is loaded into microprocessor 24. The operating software contains code specifically written for microprocessor 24 that enables the latter to read telephone numbers from buffer 20 and storage device 22 and make a comparison between them to see if they are an exact match. In an alternate embodiment of the present invention, the operating code for microprocessor 24 can be stored on the storage device 22. This allows the use of a smaller and simpler ROM 28, because the ROM 28 would be used only to instruct microprocessor to load the operating code from storage device 22 upon booting.

Microprocessor 24 reads the buffer 20 periodically (for example, five seconds) to see if the buffer 24 contains a new telephone number. If it does, then the microprocessor 24 reads the contents of buffer 20 and stores the integer representation of the telephone number into internal data register 30 as shown in FIG. 3. In an alternate embodiment, the incoming telephone number can be loaded directly into the internal data register 30 of microprocessor 24, obviating the need for buffer 20. However, in the preferred embodiment of the present invention, a separate buffer 20 is used to ensure that incoming telephone signals are not allowed to affect the internal operation of the microprocessor 24.

Once the incoming telephone number is loaded into the microprocessor 24, it sends read signals to storage device 22 that cause the latter to write out, in sequential microprocessor clock cycles, the authorized telephone numbers stored in storage device 22. The microprocessor 24 then loads the integer representation of the authorized telephone number into a second internal data register 32 as shown in FIG. 3. The microprocessor 24 then subtracts the data in registers 30 and 32 with subtracter 34. Any non-zero difference in the difference register 36 causes the inverter 38 to issue a negative (0) signal onto connection wire 25. This procedure is repeated until an exact match is encountered, in which event the zero difference between the numbers causes the inverter 38 to issue a positive (1) signal onto the connection wire 25, or the list of authorized telephone numbers is exhausted.

The connection means for connecting the telephone signals to the personal computer or network is a switch. Switch 26 is connected to incoming telephone line 8 and network telephone line 18. In the normal state, switch 26 is open, i.e., the connection between incoming telephone line 8 and network telephone line 18 is broken. In the closed state of switch 26, the connection between incoming telephone line 8 and network telephone line 18 is closed, i.e., there is a connection between the two lines and data flows along them. The switch 26 is commanded by the microprocessor 24 via connection wire 25. Upon receiving a positive connection signal on connection wire 25, the switch 26 closes and the incoming telephone line 8 is connected to the network telephone line 18. The switch 26 remains closed until the telephone connection to the network server 12 is terminated. Upon termination, switch 26 opens and remains open until a subsequent positive connection signal is received from the microprocessor 24 via connection wire 25.

Without undue modification, the microprocessor can be fitted with a clock. In the preferred embodiment of the present invention, the system 10 is provided with an internal clock that can provide the date and time. Microprocessor 24 can be programmed to write the incoming telephone number, as well as the date and time the call was placed, into the storage device 22. This feature is useful to law-enforcement officials as evidence that a hacker attempted to break into a computer network.

An alternate embodiment of the present invention is shown in FIG. 4. A personal computer 110 is connected to an external modem 120. Modem 120 is connected to the personal computer by telephone line 112. Power is fed into the modem 120 by power line 116. Similarly, telephone signals are fed into modem 120 by telephone line 140 as shown in FIG. 4. As shown in FIG. 5, the external modem 120 is built from a standard external modem with several additions. The first addition is the power switch 130, the power switch feeds power to the modem 120 and, depending upon the position of the power switch 130, also feeds power via a line 117 into the personal computer 110. A caller ID signal from the telephone company is fed into modem 120 via telephone line 140. The modem 120 is equipped with preempter system 10, identical to that described in the preferred embodiment of the present invention, that reads the caller ID signal and determines whether or not the signal is authorized. If the calling telephone number is among those authorized, the power switch 130 is switched into the "on"

position, which then sends power to the personal computer 110. If as envisioned, the personal computer is left with the proper switches in the "on" position, the personal computer would then boot automatically. Once booted, the user could then use the personal computer in a normal (remote) manner. The modem 120 could further be programmed so that, when the telephone conversation is ended, places power switch 130 in the "off" position, thereby cutting off power to personal computer 110. An external modem is shown for convenience and clarity. However, the present invention will work equally well with a similarly equipped internal modem card within standard PC card connection elements.

The alternate embodiment of the present invention can conserve a considerable amount of electrical energy. In the past, personal computers that needed to be accessed by telecommuters had to be left on the entire time. Personal computers can consume 220 Watts or more of energy continuously. With the alternate embodiment of the present invention, these machines could be left off until needed, turned on only when needed, and then turned off again. This can save many hundreds of Watt-hours in the course of a year, for each machine equipped with the alternate embodiment of the present invention.

The foregoing is a description of the arrangement and the operation of an embodiment of the invention. The scope of the invention is considered to include the described embodiment together with others obvious to those skilled in the art.

What is claimed is:

1. A method for accessing a computer from a remote location, said method comprising the steps of:
   a. receiving a signal on a telephone line, said signal designating an incoming telephone number of a telephone caller;
   b. storing said incoming telephone number in a buffer;
   c. comparing said incoming telephone number to a list of authorized telephone numbers in order to determine if said incoming telephone number is among said list of authorized telephone numbers, said list of authorized telephone numbers being kept in a memory device; and
   d. if said incoming telephone number is among said list of authorized telephone numbers, then:
      d1. automatically connecting a supply of electrical power to a totally deactivated computer resulting the booting up said computer; and
      d2. automatically connecting said telephone line to said booted up computer.

2. A method as in claim 1 further comprising the steps of:
   e. determining the date and time from a clock; and
   f. storing said date, time and said incoming telephone number in a storage means.

3. An apparatus for accessing a computer from a remote location, said apparatus comprising
   receiving means for receiving a signal on a telephone line, said signal designating an incoming telephone number of a telephone caller;
   buffer means for storing said incoming telephone number received by said receiving means;
   storage means for storing a list of authorized telephone numbers;
   comparison means for comparing said incoming telephone number to said list of authorized telephone numbers in said storage means, said comparison means providing a positive signal if said incoming telephone number is among said authorized telephone numbers and a negative signal if said incoming telephone number is not among said authorized telephone numbers; and
   connection means, responsive to said positive signal, for automatically connecting a supply of electrical power to a totally deactivated computer resulting in the booting up of said computer, and automatically connecting said telephone line to said booted up computer.

4. An apparatus as in claim 3 wherein said buffer means is a dynamic random access memory.

5. An apparatus as in claim 3 wherein said storage means is a disk memory.

6. An apparatus as in claim 3 wherein said comparison means comprises:
   a microprocessor, said microprocessor in operative connection with said buffer means and said storage means, said microprocessor capable of reading said incoming telephone number from said buffer means, said microprocessor further capable of sequentially reading said authorized telephone numbers on said storage means and comparing each of said authorized telephone numbers to said incoming telephone number to determine if said incoming telephone number exactly matches one of said authorized telephone numbers, said microprocessor means further capable of writing said positive signal to said connection means in the event that said incoming telephone number matches one of said authorized telephone numbers, said microprocessor further capable of writing said negative signal to said connection means in the event that said incoming telephone number does not match any of said authorized telephone numbers.

7. An apparatus as in claim 3 wherein said connection means comprises an electrically controlled switch.

8. An apparatus for activating a totally deactivated computer or facsimile machine from a remote location, said apparatus comprising
   receiving means for receiving a signal on a telephone line, said signal designating an incoming telephone number of a telephone caller;
   buffer means for storing said incoming telephone number received by said receiving means;
   storage means for storing a list of authorized telephone numbers;
   comparison means for comparing said incoming telephone number to said list of authorized telephone numbers in said storage means, said comparison means providing a positive signal if said incoming telephone number is among said authorized telephone numbers and a negative signal if said incoming telephone number is not among said authorized telephone numbers; and
   connection means, responsive to said positive signal, for automatically connecting a supply of electrical power to the totally deactivated computer or facsimile machine resulting in the activation of said computer or facsimile machine, and automatically connecting said telephone line to said activated computer or facsimile machine.

* * * * *